(12) United States Patent
Durand et al.

(10) Patent No.: US 7,813,370 B2
(45) Date of Patent: Oct. 12, 2010

(54) FACILITATING WIRELESS SPECTRUM MIGRATION

(75) Inventors: Roger Durand, Amherst, NH (US); Michael Yuen, Waltham, MA (US)

(73) Assignee: Autocell Laboratories, Inc., Acton, MA (US)

( * ) Notice: Subject to any disclaimer, the term of this patent is extended or adjusted under 35 U.S.C. 154(b) by 1462 days.

(21) Appl. No.: 11/113,672

(22) Filed: Apr. 25, 2005

(65) Prior Publication Data

US 2006/0239187 A1  Oct. 26, 2006

(51) Int. Cl.
 *H04L 12/28* (2006.01)
(52) U.S. Cl. ..................... 370/431; 455/63.3
(58) Field of Classification Search ................. 370/338
 See application file for complete search history.

(56) References Cited

U.S. PATENT DOCUMENTS

| | | | | |
|---|---|---|---|---|
| 5,490,137 | A * | 2/1996 | Hulsebosch et al. | 370/280 |
| 5,592,470 | A * | 1/1997 | Rudrapatna et al. | 370/320 |
| 6,795,407 | B2 | 9/2004 | Chesson | |
| 6,870,815 | B2 | 3/2005 | McFarland et al. | |
| 7,634,231 | B2 * | 12/2009 | Hundal | 455/63.1 |
| 2004/0022222 | A1 * | 2/2004 | Clisham | 370/338 |
| 2004/0028011 | A1 * | 2/2004 | Gehring et al. | 370/330 |
| 2004/0228269 | A1 * | 11/2004 | Balakrishnan et al. | 370/208 |
| 2004/0242252 | A1 * | 12/2004 | Hoeben | 455/503 |
| 2005/0018706 | A1 * | 1/2005 | Myojo | 370/445 |
| 2005/0152299 | A1 * | 7/2005 | Stephens | 370/315 |
| 2005/0191964 | A1 * | 9/2005 | Hundal | 455/63.1 |

\* cited by examiner

Primary Examiner—Kevin C Harper
Assistant Examiner—Sai-Ming Chan
(74) Attorney, Agent, or Firm—Anderson Gorecki & Manaras LLP

(57) ABSTRACT

Migrating from a legacy spectrum allocation to a target spectrum allocation can be accomplished by adding new access points and, at a selected time, activating the new access points and deactivating the legacy access points with a remote network manager. Alternatively, the new access points can initially support legacy channels and at a selected time be reconfigured to support only the target channels. Alternatively, the new access points are initially activated in a mode which supports only a subset of the target channels and at a selected time reconfigured to support only the target channels. A remote network manager may be employed to remotely monitor, reconfigure, and trigger activation and deactivation of access points in support of the technique. New access points adapted to respond to inputs from the remote network manager further facilitate the invention. For example, the new access points may be remotely configurable to activate, deactivate, support a legacy spectrum or portions thereof, support a target spectrum or portions thereof, and provide traffic load and other data to the remote network manager.

11 Claims, 7 Drawing Sheets

FACILITATING WIRELESS SPECTRUM MIGRATION

FIELD OF THE INVENTION

This invention relates generally to the field of wireless communications, and more particularly to facilitating migration between spectrum allocations.

BACKGROUND OF THE INVENTION

Wireless communications technologies such as cellular telephone networks and Wireless Local Area Networks ("WLANs") currently enjoy increasing popularity in terms of growing number of subscribers and the extension of technological capabilities in order to support new services. Increases in the overall number of users combined with increased bandwidth usage per user as a result of introduction of new services can result in a shortage of bandwidth. In response to bandwidth shortage regulatory authorities may reallocate regulated spectrum. For example, bandwidth may be taken from a technology in decline or of lesser importance and allocated to a technology that is growing in popularity or of greater importance. In the case of a currently proposed reallocation in Japan which is illustrated in FIG. 1, the reason for reallocating bandwidth may be to more closely follow allocations made by other nations which form a de facto international standard. Whatever the reason for bandwidth reallocation, the transition between allocation models can be problematic.

One problem associated with reallocation of spectrum is migration of equipment. Simultaneous use of equipment that conforms with the new allocation and equipment that conforms with the legacy allocation can result in interference and incompatibility issues. In the example illustrated in FIG. 1 the channel centers are being reassigned in a portion of the spectrum, and new channels are being added by expanding the boundaries of the spectrum. It will be apparent that operation on channels 34, 38, 42 and 46 of the existing allocation will interfere with channels 36, 40, 44 and 48 of the target spectrum. In particular, existing channel 34 will interfere with target channel 36, existing channel 38 will interfere with target channels 36 and 40, existing channel 42 will interfere with target channels 40 and 44, and so on. However, regulators often allow a period of time for the old equipment to continue operation under the old regulatory rules. This time period overlaps the time for new equipment to be deployed under the guidelines of the new regulatory rules. During this time overlap, significant operational problems may be encountered. For example, equipment may be deployed following either the old rules or the new rules. This tends to exacerbate the incapability and system cost problems. At some point in time the old equipment becomes prohibited and the new equipment rules must be followed. While it might be possible to replace the legacy equipment with new equipment at a specified point in time, this could impose a significant burden on network operators in terms of effort to remove and install equipment and the cost of the new equipment. It is therefore desirable to have technology to gracefully migrate between the two spectrum allocations.

SUMMARY OF THE INVENTION

In accordance with the invention, migrating from a first spectrum allocation to a second spectrum allocation in a wireless network having a plurality of devices configured to support the first spectrum allocation and not configured to support the second spectrum allocation can be accomplished by adding to the wireless network a plurality of devices configured to support the second spectrum allocation, and at a selected time, activating the devices configured to support the second spectrum allocation. Alternatively, a plurality of devices configured to selectably support either the first spectrum allocation or the second spectrum allocation are added to the network, the added devices are activated in a mode which supports the first spectrum allocation, and at a selected time, the added devices are reconfigured to support the second spectrum allocation. Alternatively, a plurality of devices configured to selectably support a portion of the second spectrum allocation are added to the wireless network, the added devices are activated in a mode which supports only a portion of the second spectrum allocation, and at a selected time, the added devices are reconfigured to support the entire second spectrum allocation.

A remote network manager may be employed to remotely monitor, reconfigure, and trigger activation and deactivation of access points in support of the technique. Use of the remote network manager facilitates migration by reducing the number of changes to the network requiring manual intervention. New access points adapted to respond to inputs from the remote network manager further facilitate the invention. For example, the new access points may be remotely configurable to activate, deactivate, support a legacy spectrum or portions thereof, support a target spectrum or portions thereof, and provide traffic load and other data to the remote network manager.

DETAILED DESCRIPTION

Figure 1:
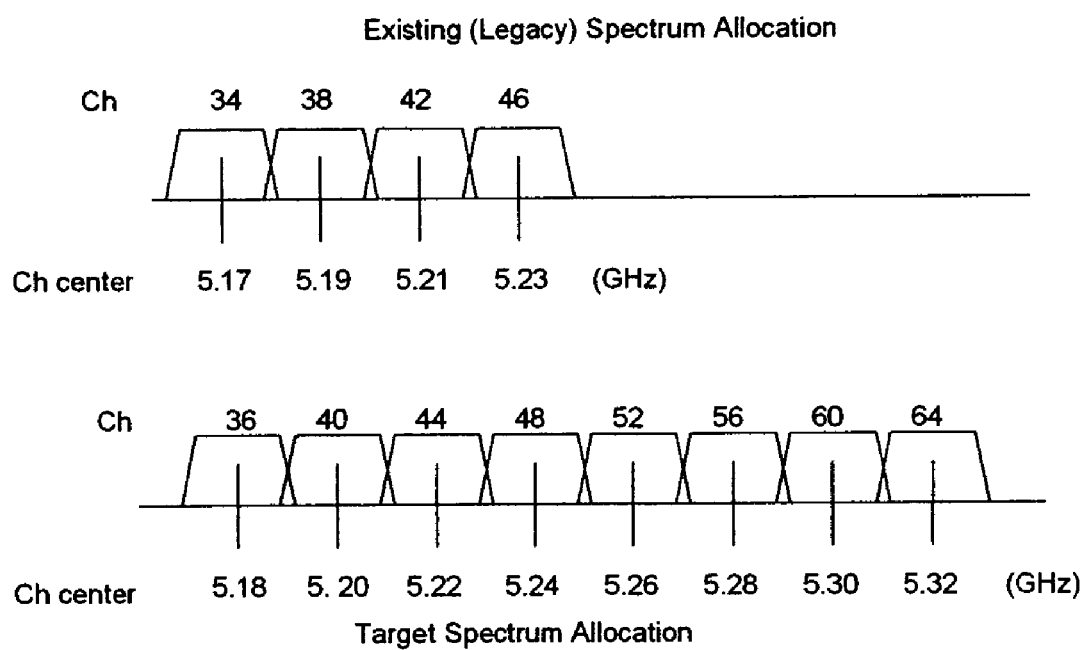
FIG. 1 is a diagram illustrating a spectrum reallocation.
Figure 2:
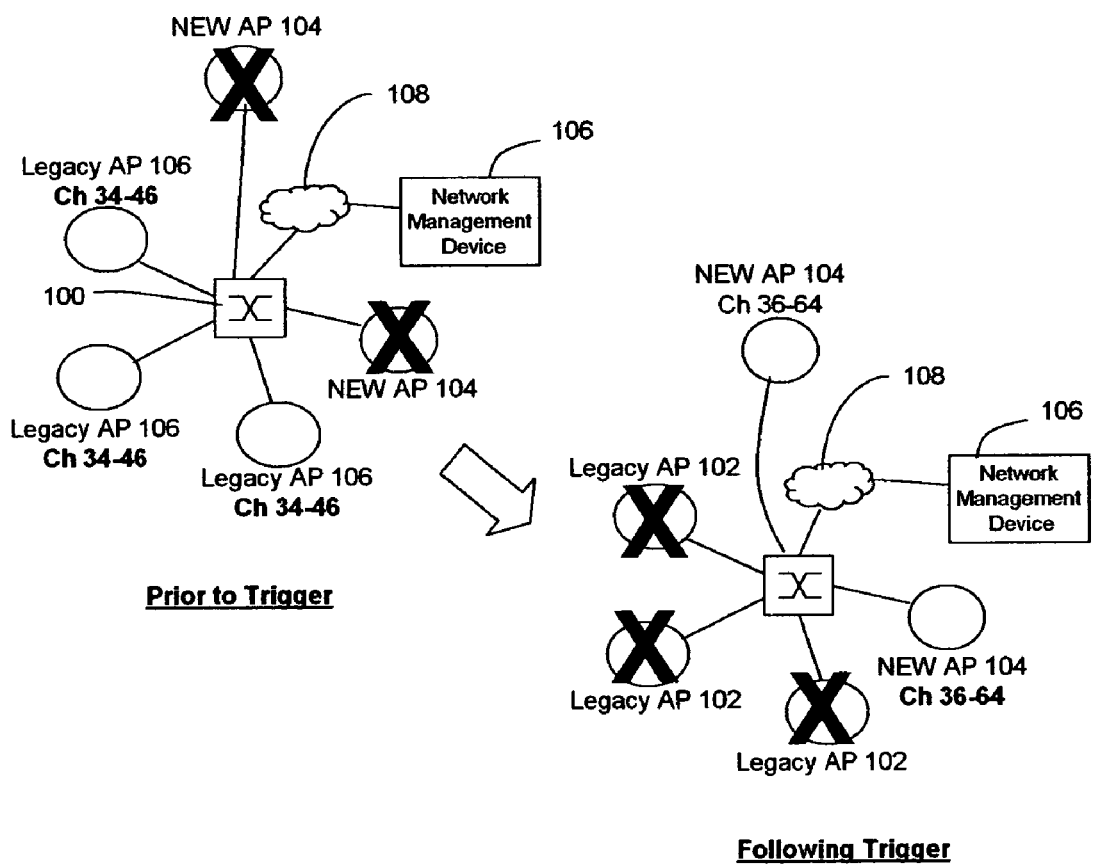
FIG. 2 illustrates a single event migration in which a new access point becomes active.

Referring to FIGS. 1 and 2, a WLAN includes at least one switch (100) and a plurality of access points, including both legacy access points (102) and new access points (104). The switch is in communication with a network management device (106) via a wider area network (108) such as the internet. Although not specifically illustrated, prior to the start of migration activities the WLAN includes only legacy access points that comply with the existing spectrum allocation. In other words, only channels 34, 38, 42 and 46 are active and supported. Upon completion of migration activities the WLAN may include only new access points that support the target spectrum allocation. In other words, only channels 36, 40, 44, 48, 52, 56, 60 and 64 are active and supported. The invention facilitates migration between the legacy spectrum allocation and the target spectrum allocation.

One technique for migrating from the legacy spectrum allocation to the target spectrum allocation is to contemporaneously cease support for all channels of the legacy spectrum, i.e., channels 34, 38, 42, 46, and begin support for all channels of the target spectrum, i.e., channels 36, 40, 44, 48, 52, 56, 60, 64, at a given point in time. This technique may be implemented by employing the network management device (106) to modify operation of the access points (102, 104). Migration is started by adding at least one new access point (104) to the WLAN. Each new access point is initially inactive when added to the WLAN. However, in response to a trigger input from the network management device (106) the legacy access points (102) are deactivated and the new access points (104) are activated. In terms of supported channels, prior to the trigger the WLAN supports only channels 34, 38, 42, 46, and after the trigger the WLAN supports only channels 36, 40, 44, 48, 52, 56, 60, 64. As a practical matter, it may only be possible to activate new access points (104) using remote commands from the network management device (106), in which case the legacy access points (104) would be deactivated and removed manually. While this technique may still impose a burden on equipment manufacturers and customers in terms of equipment purchase and installation, it mitigates the likelihood of interference between new and legacy devices supporting the two spectrums by facilitating shutdown of non-compliant devices.

Figure 3:
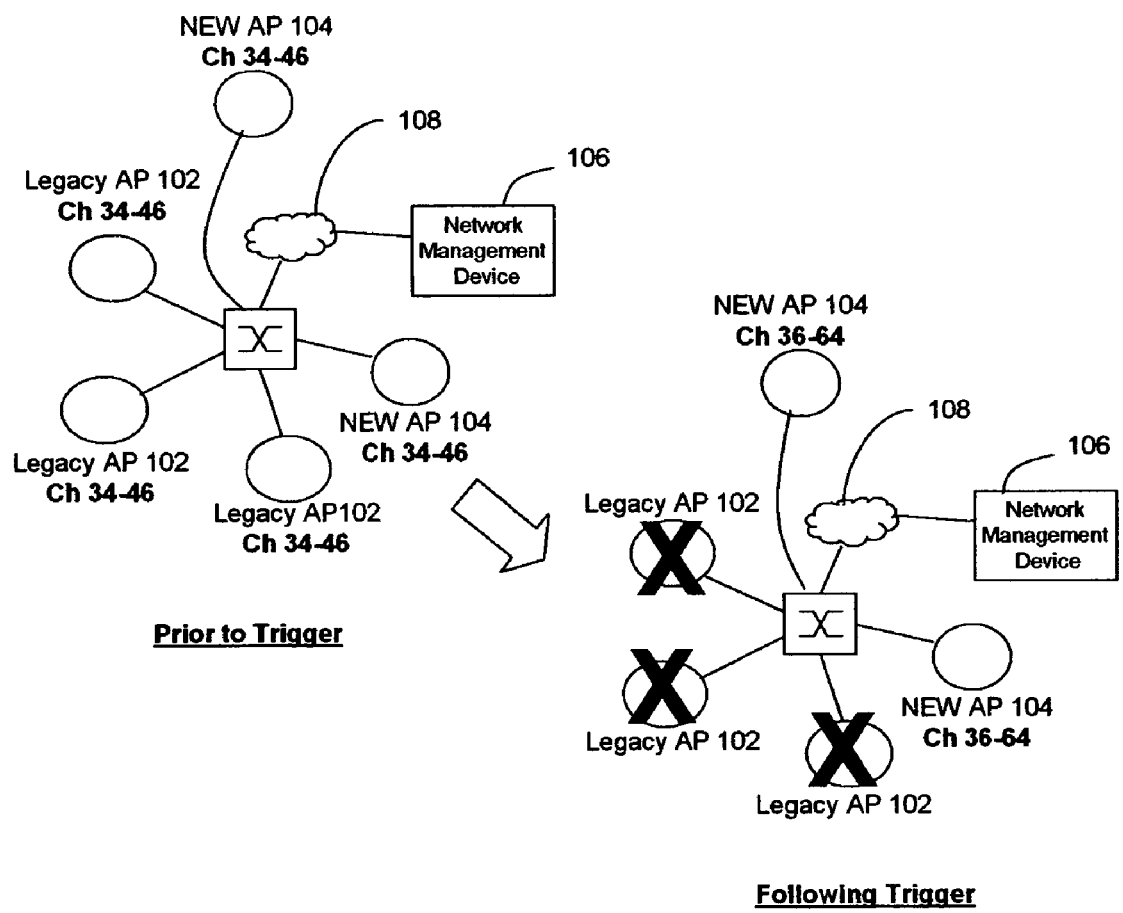
FIG. 3 illustrates a single event migration in which the new access point changes configuration.

Referring now to FIGS. 1 and 3, in an alternative embodiment the new access points (104) are configured to selectively support either the legacy spectrum allocation or the target spectrum allocation. Migration is started by adding at least one new access point (104) to the WLAN. After being added to the WLAN the new access point is activated but supports only the legacy spectrum allocation, e.g., channels 34, 38, 42, 46. Subsequently, in response to a trigger input from the network management device (106) the new access points (104) are reconfigured to support the target spectrum allocation. In particular, the new access points (104) cease support for the legacy spectrum allocation and begin support for the target spectrum allocation, i.e., deactivate channels 34, 38, 42, 46, and activate channels 36, 40, 44, 48, 52, 56, 60, 64. Contemporaneously with the trigger, or in response thereto, the legacy access points (102) cease operation. Advantages of this embodiment include an extended period for installation of the new access points and facilitated switchover to the target spectrum.

Figure 4:
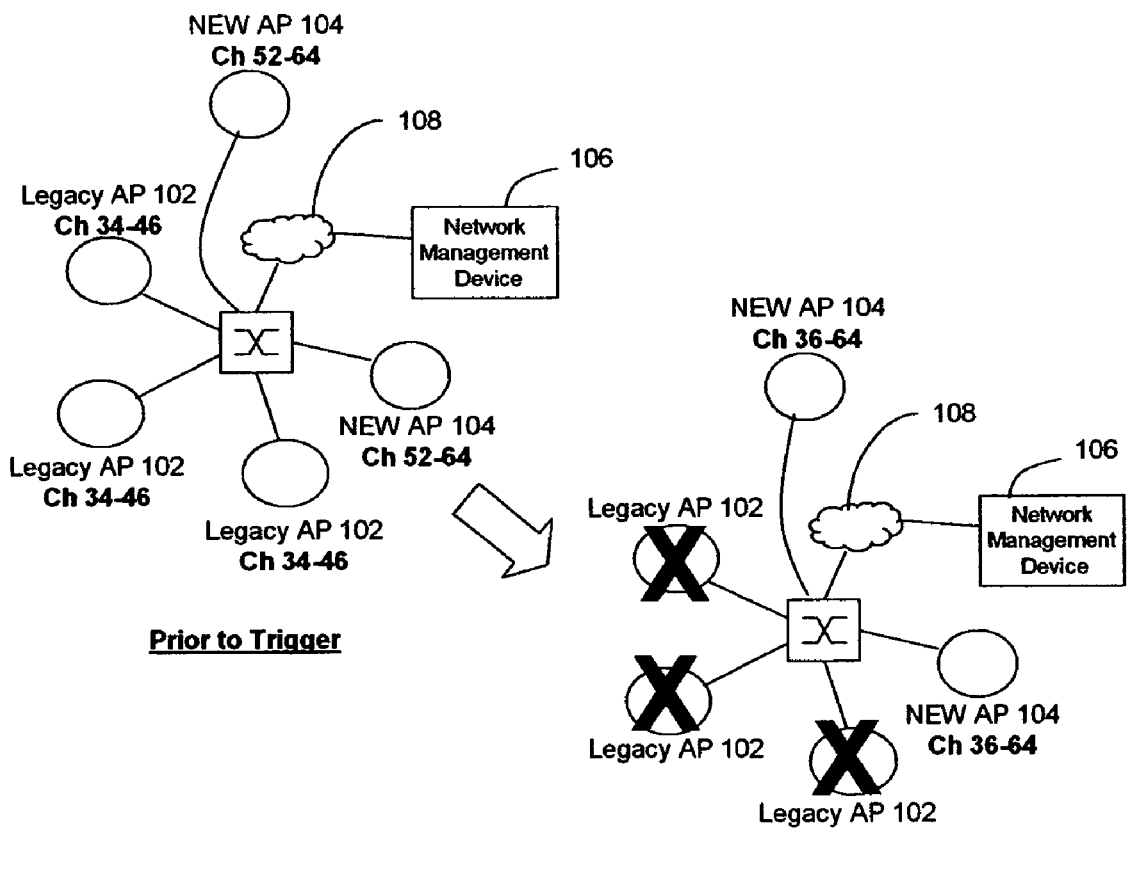
FIG. 4 illustrates a single event migration in which the new access point initially employs only a portion of the target spectrum.

Referring to FIGS. 1 and 4, in another alternative embodiment the migration includes at least one intermediate stage prior to the trigger during which portions of both the legacy spectrum allocation and target spectrum allocation are simultaneously utilized. Migration is started by adding at least one new access point (104) to the WLAN. When added to the WLAN the new access points (104) are active and support only a portion of the target spectrum allocation that does not interfere with the legacy spectrum allocation, i.e., channels 52, 56, 60, 64. Subsequently, in response to a trigger input from the network management device (106) the new access points begin support for the entire target spectrum, i.e., channels 36, 40, 44, 48, 52, 56, 60, 64. Contemporaneously with the trigger, or in response thereto, the legacy access points (102) cease operation. Advantages of this embodiment include an extended period for installation of the new access points and facilitated switchover to the target spectrum.

Figure 5A:
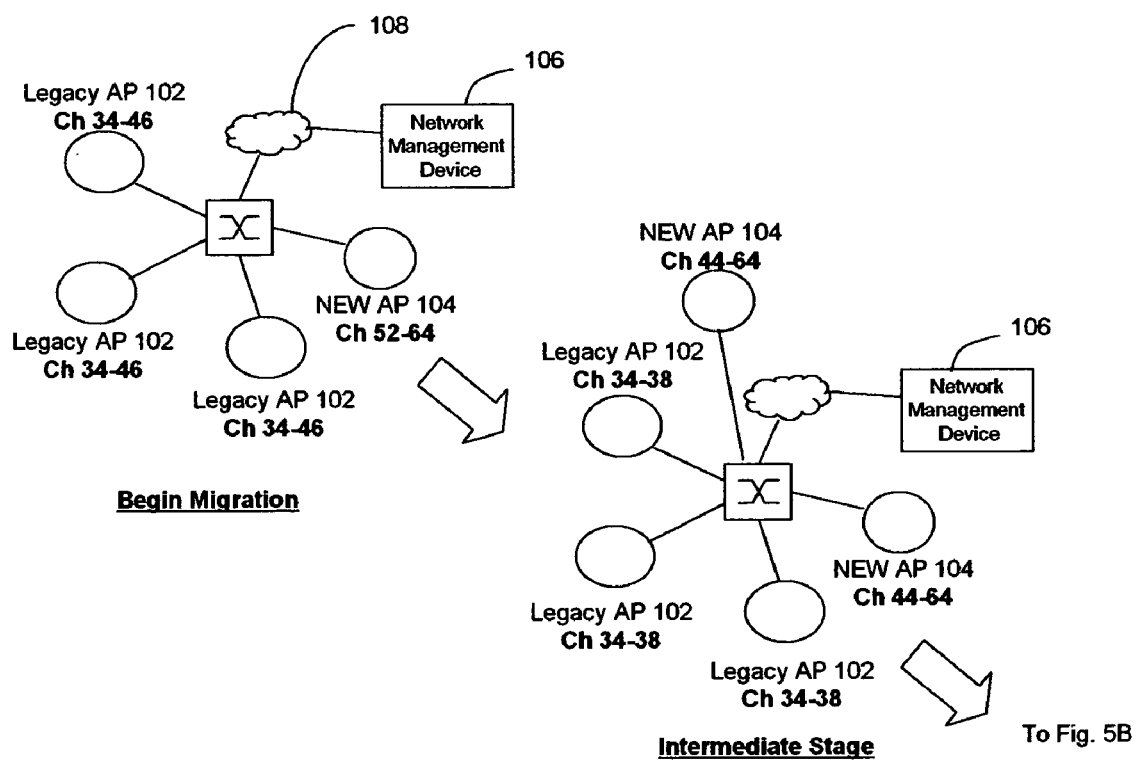
FIGS. 5A and 5B illustrate a multi-event migration in which load balancing is employed to reconfigure both new and legacy access points.
Figure 5B:
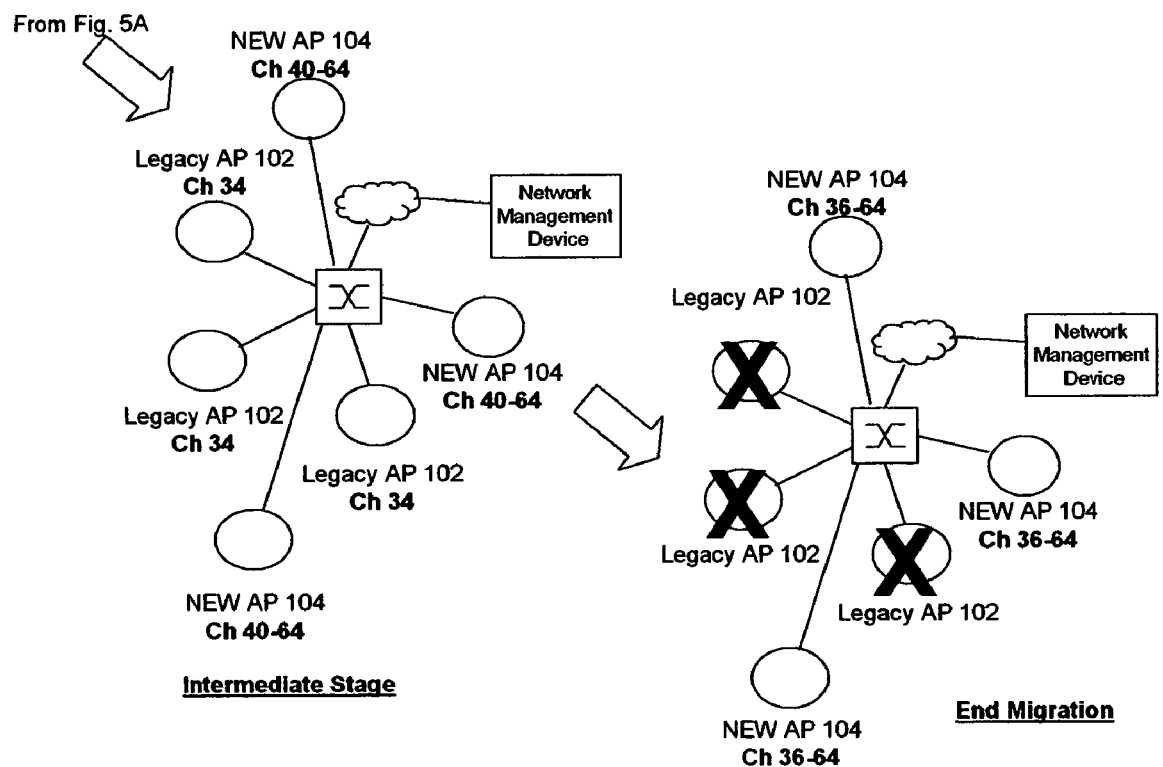

Referring to FIGS. 1, 5A and 5B, in another alternative embodiment the migration includes a plurality of intermediate stages during which variable portions of both the legacy spectrum allocation and target spectrum allocation are simultaneously utilized. The migration is started by adding at least one new access point (104) to the WLAN. In order to share the available spectrum between the legacy access points (102) and the new access points (104), a first portion of the spectrum is temporarily allocated to the legacy access points and a second portion is temporarily allocated to the new access points. In the illustrated example the new access points initially support that portion of the target spectrum which does not interfere with the legacy spectrum, i.e., channels 52, 56, 60, 64. At this stage the legacy access points (102) support the entire legacy spectrum, i.e., channels 34, 38, 42, 46.

The network management device (106) monitors the access points and adjusts the temporary allocations of spectrum. For example, the allocation may be incrementally, e.g., channel by channel, adjusted over time in favor of the target spectrum allocation in order to achieve migration over a selected period of time. Alternatively, the network management device may adjust the temporary allocations based upon the load supported by the different types of access points. For example, if the legacy access points (102) support 80% of the traffic, then approximately 80% of the available spectrum, in terms of channels, may be temporarily allocated to the legacy access points. Of course, in the illustrated example the legacy devices are not capable of utilizing 80% of the target spectrum because they cannot utilize the spectrum associated with channels 52, 56, 60, 64. Further, it will be recognized that the limited number of channels may not provide the resolution necessary to achieve perfect load balance, and hence the load balance is only approximate.

Further adjustments are made as traffic patterns change over time. For example, if at some subsequent point in time the legacy channels support only 25% of the WLAN load then individual channels may be reallocated in response. In the illustrated intermediate stage the legacy access points (102) collectively supporting 25% of the WLAN load are limited to channels 34 and 38, while the new access points (104) supporting 75% of the load utilize channels 44, 48, 52, 56, 60 and 64. Later, the legacy access points are reduced to channel 34, while the new access points utilize channels 40, 44, 48, 52, 56, 60, 64. This process continues until the legacy access points fail to justify even a single channel. Hence, the migration can follow the natural development of the network.

Figure 6:
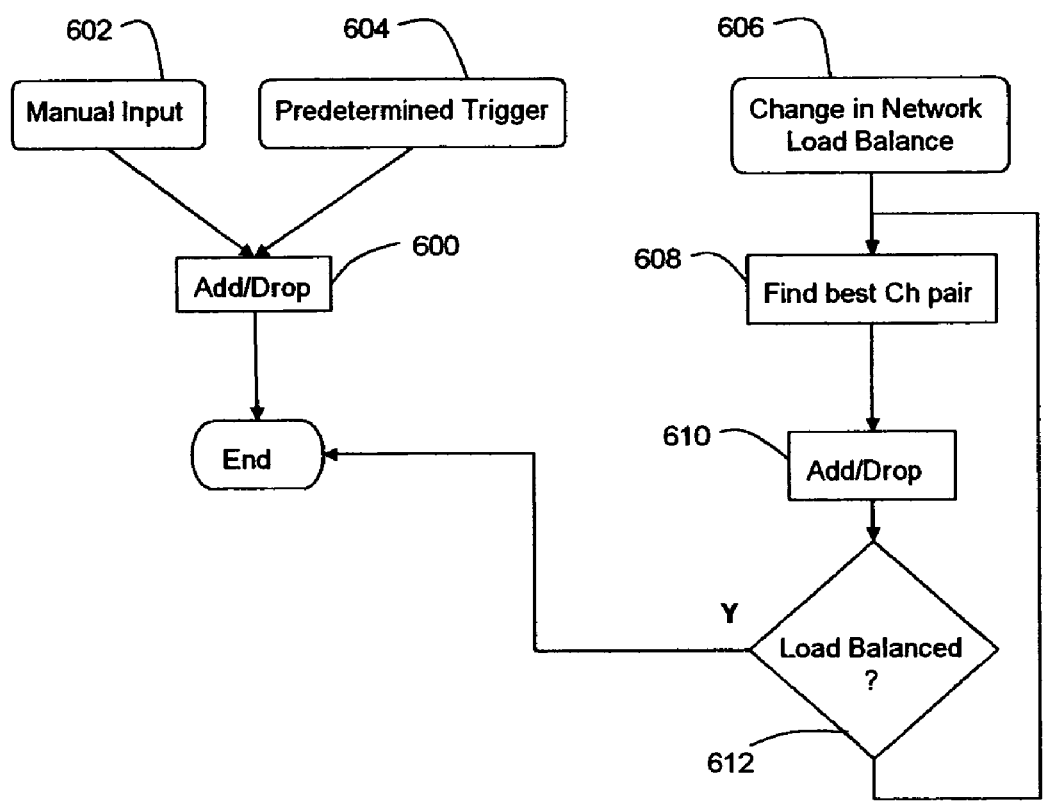
FIG. 6 is a flow diagram illustrating a method for performing the migrations of FIGS. 2 through 5.

FIG. 6 illustrates a method for implementing the migration techniques described above. An adjustment to the allocated spectrum, including dropping of at least one channel or adding at least one channel, as indicated by step (600), can be triggered by a manual input as indicated by step (602) or by a predetermined trigger as indicated by step (604). The predetermined trigger could be a point in time, a response to a network condition, a response to addition of a particular network device, or type of device, or any other trigger. A readjustment associated with load balancing is triggered by a sensed change in network load balance as indicated by step (606). The network management device then determined the best channel pair, as indicated by step (608), to use in a channel add/drop action as indicated by step (610). For example, a channel from the existing spectrum allocation may be selected for drop while a channel from the target spectrum allocation may be selected for add. The channel pair are selected to achieve a desired metric of efficient bandwidth use. For example, the channel pair may be selected to produce the maximum possible number of channels. For the allocations illustrated in FIG. 1 the following pairings (add/drop) would be selected in the order listed: (48, 46), (44, 42), (40, 38), and (36, 34). A determination is then made as to whether the load is balanced as indicated by step (612). If the load is not balanced then flow returns to step (608). It will be recognized that it may not be possible to precisely balance the traffic load.

While the invention is described through the above exemplary embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. For example, a distributed control model could be implemented where individual access points, switches, or other devices control migration rather than the network management device. Further, the network might be seeded with access points, switches, or other devices which prompt reconfiguration of neighboring devices. The invention should also not be viewed as limited to migration of frequency and channels. For example, the inventive concepts could be used to migrate modulation (e.g., AMPS, TDMA, CDMA, GSM), coding, software revisions, or other communications frameworks. Additionally, legacy equipment could be reconfigured to conform with the new allocation rather than simply disabled and removed from the network to complete migration. Accordingly, the invention should not be viewed as limited except by the scope and spirit of the appended claims.

What is claimed is:

1. A method comprising the steps of:
migrating from a first spectrum allocation to a second spectrum allocation in a wireless network having a plurality of devices configured to support the first spectrum allocation and not configured to support the second spectrum allocation, where the first and second spectrum allocations at least partially overlap and have different channel centers, including adding to the wireless network a plurality of devices configured to selectably support a portion of the second spectrum allocation; activating the added devices in a mode which supports only a portion of the second spectrum allocation; and at a selected time, reconfiguring the added devices to support the entire second spectrum allocation.

2. The method of claim 1 including the further step of selecting the portion of the second spectrum such that interference with the first spectrum allocation is mitigated.

3. The method of claim 1 further including a remote network manager, and including the further step of remotely reconfiguring the added devices configured to support the second spectrum allocation.

4. The method of claim 3 including the further step of, at a selected time, remotely deactivating the devices configured to support the first spectrum allocation.

5. The method of claim 1 including the further step of incrementally reconfiguring the devices in a plurality of stages, in each stage deactivating a channel of the first spectrum allocation and activating a channel of the second spectrum allocation.

6. The method of claim 1 including the further step of reconfiguring at least some of the devices, to the extent supported, such that the number of channels of the spectrum allocation relative to the second spectrum allocation is approximately equal to relative traffic load on each spectrum.

7. Apparatus for migrating from a first spectrum allocation to a second spectrum allocation in a wireless network having a plurality of access points configured to support the first spectrum allocation and not configured to support the second spectrum allocation, where the first and second spectrum allocations at least partially overlap and have different channel centers, comprising the steps of:
a plurality of wireless access points configured to be added to the network and to selectably support a portion of the second spectrum allocation, and being operable initially in a mode which supports only a portion of the second spectrum allocation; and
at least one device operable to reconfigure the added access points to support the entire second spectrum allocation,
wherein reconfiguring the added access points to support the entire second spectrum allocation leads to migration from the first spectrum allocation to the second spectrum allocation.

8. The apparatus of claim 7 wherein the remote network manager is further operable to select the portion of the second spectrum such that interference with the first spectrum allocation is mitigated.

9. The apparatus of claim 7 wherein the at least one device is further operable to deactivate the access points configured to support the first spectrum allocation.

10. The apparatus of claim 7 wherein the at least one device is further operable to incrementally reconfigure the access points in a plurality of stages, in each stage deactivating a channel of the first spectrum allocation and activating a channel of the second spectrum allocation.

11. The apparatus of claim 7 wherein the at least one device is further operable to reconfigure at least some of the access points, to the extent supported, such that the number of channels of the spectrum allocation relative to the second spectrum allocation is approximately equal to relative traffic load on each spectrum.

* * * * *